United States Patent
Van Minnebruggen et al.

(10) Patent No.: US 11,173,448 B2
(45) Date of Patent: Nov. 16, 2021

(54) DRYER FOR COMPRESSED GAS, COMPRESSOR INSTALLATION PROVIDED WITH SUCH A DRYER AND METHOD FOR DRYING GAS

(71) Applicant: ATLAS COPCO AIRPOWER, NAAMLOZE VENNOOTSCHAP, Wilrijk (BE)

(72) Inventors: Ewan Van Minnebruggen, Wilrijk (BE); Danny Vertriest, Wilrijk (BE); Tim Ceyssens, Wilrijk (BE); Geert Hellemans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 164 days.

(21) Appl. No.: 16/663,463

(22) Filed: Oct. 25, 2019

(65) Prior Publication Data
US 2020/0054992 A1     Feb. 20, 2020

Related U.S. Application Data (63) Continuation of application No. 15/535,644, filed as application No. PCT/BE2015/000016 on Apr. 28, 2015, now Pat. No. 10,478,771.

(30) Foreign Application Priority Data

Dec. 16, 2014    (BE) .................................... 2014/0843

(51) Int. Cl.
*B01D 53/06*     (2006.01)
*B01D 53/26*     (2006.01)
(Continued)

(52) U.S. Cl.
CPC ........... *B01D 53/261* (2013.01); *B01D 53/06* (2013.01); *F04B 39/16* (2013.01);
(Continued)

(58) Field of Classification Search
CPC .. B01D 53/06; B01D 53/261; B01D 2257/80; B01D 2259/4009; F24F 3/1423;
(Continued)

(56) References Cited

U.S. PATENT DOCUMENTS 4,409,006 A    10/1983   Mattia
4,729,774 A     3/1988   Cohen et al.
(Continued)

FOREIGN PATENT DOCUMENTS

CN    1 471 422     1/2004
DE    3 814 175    11/1988
(Continued)

OTHER PUBLICATIONS

International Search Report (ISR) dated Sep. 4, 2015, for PCT/BE2015/000016.

*Primary Examiner* — Frank M Lawrence, Jr.
(74) *Attorney, Agent, or Firm* — Bacon & Thomas, PLLC (57) ABSTRACT

A dryer for a compressed gas provided with a vessel with a drying agent and a drying zone-and a regeneration zone; at least one intermediate zone that, viewed in the direction of rotation of the drum, is situated between the regeneration zone and the drying zone and which is provided with a separate inlet and an outlet that is shared with or connected to the outlet of the regeneration zone; a tap-off pipe that branches off from the outlet of the drying zone and connects to the aforementioned separate inlet of the intermediate zone; one or more blowers in the tap-off pipe for effectuating an intermediate flow from the drying zone, where the dryer is configured such that the entire flow of gas to be dried (Continued)

supplied to the dryer is first guided through the regeneration zone.

20 Claims, 10 Drawing Sheets

(51) Int. Cl.
*F24F 3/14* (2006.01)
*F04B 39/16* (2006.01)
*F04C 29/00* (2006.01)
*F04C 18/02* (2006.01)
*F04C 18/16* (2006.01)
*F04C 23/00* (2006.01)

(52) U.S. Cl.
CPC ........ *F04C 29/0092* (2013.01); *F24F 3/1423* (2013.01); *B01D 2257/80* (2013.01); *B01D 2259/4009* (2013.01); *F04C 18/0215* (2013.01); *F04C 18/16* (2013.01); *F04C 23/003* (2013.01)

(58) Field of Classification Search
CPC ...... F04B 39/16; F04C 18/0215; F04C 18/16; F04C 23/003; F04C 29/0092
USPC ........... 95/19, 22, 14, 113; 96/112, 113, 125
See application file for complete search history.

(56) References Cited

U.S. PATENT DOCUMENTS

| | | |
|---|---|---|
| 4,783,432 A | 11/1988 | Settlemyer |
| 5,667,560 A | 9/1997 | Dunne |
| 5,701,762 A | 12/1997 | Akamatsu et al. |
| 6,165,254 A | 12/2000 | Kawakami et al. |
| 6,294,000 B1 | 9/2001 | Klobucar |
| 6,328,787 B1 | 12/2001 | Yamauchi |
| 6,375,722 B1 | 4/2002 | Henderson et al. |
| 6,447,583 B1 * | 9/2002 | Thelen ................... B01D 53/06 95/113 |
| 6,666,911 B2 | 12/2003 | Chou et al. |
| 7,338,548 B2 | 3/2008 | Boutall |
| 7,569,095 B2 | 8/2009 | Vanderstraeten et al. |
| 7,789,942 B2 | 9/2010 | Vanderstraeten et al. |
| 7,886,986 B2 * | 2/2011 | Fischer, Jr. ........... F24F 3/1423 236/49.3 |
| 8,328,904 B2 | 12/2012 | Griffiths et al. |
| 10,478,771 B2 * | 11/2019 | Van Minnebruggen ..................... B01D 53/261 |
| 2011/0132191 A1 | 6/2011 | Fredenhagen et al. |
| 2012/0118152 A1 | 5/2012 | Vermeer |
| 2012/0125195 A1 | 5/2012 | Vanderstraeten |

FOREIGN PATENT DOCUMENTS

| | | |
|---|---|---|
| DE | 3902977 A1 | 8/1989 |
| DE | 10 2006 022293 | 11/2007 |
| DE | 202014007507 U1 | 12/2014 |
| EP | 2332631 A1 | 6/2011 |
| JP | 05-115736 | 5/1993 |
| JP | 05-200233 | 8/1993 |
| JP | 06-343818 | 12/1994 |
| JP | 10-085546 | 4/1998 |
| JP | 2001-179036 | 7/2001 |
| JP | 2002-186822 | 7/2002 |
| WO | 00/74819 A1 | 12/2000 |
| WO | 02/38251 | 5/2002 |
| WO | 2005/070 518 | 8/2005 |
| WO | 2006/012 711 | 2/2006 |
| WO | 2011/017782 A1 | 2/2011 |
| WO | 2011/017784 A1 | 2/2011 |

* cited by examiner

Fig.10

DRYER FOR COMPRESSED GAS, COMPRESSOR INSTALLATION PROVIDED WITH SUCH A DRYER AND METHOD FOR DRYING GAS

The present invention relates to a dryer for compressed gas and a compressor installation and a method for drying gas.

BACKGROUND OF THE INVENTION

Dryers for compressed gas are already known whereby these dryers are provided with a vessel with a drying zone and a regeneration zone therein and if need be a cooling zone; an inlet to the drying zone for the supply of compressed gas to be dried and an outlet from the drying zone for the removal of dried gas; an inlet to the regeneration zone for the supply of a hot regeneration gas and an outlet from the regeneration zone; a rotatable drum in the vessel with a regeneratable drying agent therein; drive means for rotating the aforementioned drum such that the drying agent is successively moved through the drying zone and regeneration zone, whereby the aforementioned outlet of the regeneration zone and any cooling zone is connected to the aforementioned inlet of the drying zone by means of a connecting pipe with a cooler and condensate separator therein, and whereby these dryers are configured such that, during the operation of the dryer, the gas flow rate that leaves the regeneration zone via the outlet of the regeneration zone is equal or practically equal to the gas flow rate that is then guided into the drying zone via the inlet in order to be dried.

An example of a dryer whereby the flow rate of regeneration gas leaving the regeneration zone matches the flow rate of gas to be dried that is guided into the drying zone is described in EP 2.332.631. The hot compressed gas is first guided through the regeneration zone where it acts as a regeneration gas and absorbs moisture from the drying agent for the regeneration of this drying agent. In the embodiments described in EP 2.332.631 environmental air is compressed for example, by means of an air compressor for example, whereby during compression this air not only undergoes a pressure increase, but also experiences a temperature increase such that the relative humidity of this air falls and this air is able to absorb moisture from the drying agent. Dryers that make use of the heat of compression present in the compressed regeneration gas are known in the industry by the name of 'heat of compression' dryers or HOC dryers.

After passing through the regeneration zone the hot regeneration gas presents a higher relative humidity. The moist gas that leaves the regeneration zone is then guided through a cooler in the connecting pipe such that the temperature of this gas falls below the pressure dew point and condensation of the moisture present in this gas occurs. The droplets hereby formed are then removed by means of the condensate separator such that the now cooled, compressed gas is 100% saturated and is fully guided to the inlet of the drying zone and through this drying zone, where the drying agent extracts moisture from this compressed gas by means of sorption (adsorption and/or absorption).

The dried gas that leaves the drying zone can be used in a compressed air network located downstream from the dryer for all types of purposes such as for pneumatic conveyors, the drive of pneumatically driven tools and similar.

It is characteristic of the type of dryer described above in EP 2.332.631 that the entire or practically entire compressed gas flow, originating from the compressor, is first guided through the regeneration zone and then guided in full through the drying zone. Dryers that make use of such a full flow of the gas through the regeneration zone and drying zone are also called full-flow dryers.

In the connecting pipe between the outlet of the regeneration zone and the inlet of the drying zone there is a blower to increase the pressure of the gas flow in order to ensure that the pressure at the outlet of the drying zone is higher than the pressure at the inlet of the regeneration zone, such that it prevents moist gas from the compressor being able to leak to the outlet of the drying zone, where it could mix with the dried gas, such that the gas that goes downstream to the consumer network via the dryer output would be much less dry.

EP 2.332.631 also describes a variant in which an intermediate cooling zone is provided between the regeneration zone and drying zone that follows the regeneration zone in the direction of rotation of the drum, whereby cool dry air is tapped off at the outlet of the dryer and guided through the cooling zone to the outlet of the regeneration zone.

In other arrangements, for example as described in WO 00/74819, the bulk of the hot compressed gas that leaves the compressor is first guided through an aftercooler to then be transported to the drying zone. Only a part of the hot compressed gas is tapped off downstream from the compressor and upstream from the aftercooler to be transported to the regeneration zone for the regeneration of the drying agent. Such a dryer as described in WO 00/74819 is thus a heat of compression dryer, but does not operate according to the full flow principle, as not all the flow of hot compressed gas is used as regeneration gas.

A heat of compression dryer is also described in WO 2011/017782 that does not operate according to the aforementioned full flow principle. The dryer as described in WO 2011/017782 presents the special characteristic that the regeneration zone comprises two subzones, i.e. a first subzone through which a first regeneration flow is transported and an intermediate zone or second subzone through which a second regeneration flow is transported and whereby the dryer is configured such that the relative humidity of the aforementioned second regeneration flow is lower than the relative humidity of the aforementioned first regeneration flow that is guided through the first subzone. The second subzone is preferably at the end of the regeneration zone. In this way more moisture can be absorbed from the drying agent than in a conventional way, such that more moisture can be absorbed from the gas to be dried in the drying zone by the drying agent.

With such a dryer according to WO 2011/017782 it can happen that in certain circumstances, for example when starting up a compressor that supplies a gas to be dried to the dryer, the desired flow of the second regeneration flow cannot be realised as the pressure in the drying zone has not yet built up sufficiently. In some cases gas could even temporarily go from the regeneration zone, through any leaks or even via the tap-off pipe, into the outlet of the drying zone, which could result in undesired dew point peaks. The present invention is aimed at avoiding such circumstances as much as possible.

SUMMARY OF THE INVENTION

The present invention concerns an improved dryer that yields optimum performance, both with regard to energy consumption and with regard to dryer efficiency, by utilising the intrinsic heat in the compressed gas supplied to the optimum, and also by obtaining deep drying of the drying agent, such that the relative humidity of the compressed gas that leaves the dryer can be made as low as possible. Moreover, the invention is aimed at being able to guarantee the high dryer efficiency to the optimum possible in as many usage conditions as is possible, and also preventing dew point peaks during the start-up of the system.

To this end the present invention concerns a dryer for a compressed gas supplied, whereby this dryer is provided with a vessel with a drying zone and regeneration zone therein; an inlet for the regeneration zone that is also an inlet for the supply of gas to be dried and an outlet for the regeneration zone; an inlet for the drying zone and an outlet for the drying zone that is also the outlet of the dryer from where dried compressed gas can be tapped off for a downstream consumer network; a rotatable drum in the vessel with a regenerable drying agent therein; drive means for rotating the aforementioned drum such that the drying agent is moved successively through the drying zone and the regeneration zone; a connecting pipe that connects the aforementioned outlet of the regeneration zone to the aforementioned inlet of the drying zone; a cooler and condensate separator incorporated in the connecting pipe; at least one intermediate zone that, viewed in the direction of rotation of the drum, is situated between the regeneration zone and the drying zone and which is provided with a separate inlet and an outlet that is shared with or connected to the outlet of the regeneration zone; a tap-off pipe that branches off from the outlet of the drying zone and connects to the aforementioned separate inlet of the intermediate zone; means for effectuating an intermediate flow from the drying zone, through the tap-off pipe, to the intermediate zone, whereby the dryer is configured such that the entire flow of gas to be dried supplied to the dryer is first guided through the regeneration zone before flowing through the drying zone and whereby the aforementioned means are only formed by one or more blowers in the aforementioned tap-off pipe.

A "blower" here means a device for (actively) increasing the pressure of a gas or a mixture of gases such as air, such as a compressor. Increasing the pressure means that the pressure on the outlet side of the blower, during operation of the blower, is higher than the pressure on the inlet side of this blower. In this context a venturi ejector is not considered to be a blower.

The "connecting pipe" and the "tap-off pipe" can be constructed in different ways according to the invention, and such that it allows a flow to be channeled, for example in the form of a pipe construction or another form of channeling that is integrated or otherwise.

The expression "aforementioned means are only formed by one or more blowers in the aforementioned tap-off pipe" means that no blowers are provided in other places than in the tap-off pipe and that a blower is not provided in the connecting pipe, for example, as with existing dryers.

Alongside achieving the said objective of ensuring the high efficiency in different conditions, the specific location of the means leads to a less powerful blower being required, as in this case the blower only has to ensure a pressure increase of the intermediate gas flow that is only a fraction of the total gas flow that is guided through the dryer, such that this blower will also consume less energy than with known dryers. The blower can also be smaller, which can be useful from the point of view of saving space.

Due to the increased pressure at the inlet of the intermediate zone it is ensured that this intermediate gas flow forms a wall as it were for leaks that could otherwise occur between the moist air supplied to the inlet of the first regeneration zone and the outlet of the drying zone.

The intermediate zone, viewed in the direction of rotation of the drum, can be at the end of the regeneration zone, or in other words at the side of the regeneration zone along which the drying agent, during the rotation of the drum, leaves the regeneration zone to go into the drying zone.

The intermediate zone, viewed in the direction of rotation of the drum, can also be at the start of the regeneration zone or an intermediate zone can be provided at both the end and the start of this regeneration zone, whereby in this last case the drying zone is screened off along both sides against possible leaks of non-dried gas from the regeneration zone.

When the tapped-off dried and cooled gas is guided untreated to the input of the intermediate zone, the intermediate gas flow acts as an intermediate temperature buffer between the hot regeneration zone and the cooled drying zone, such that the temperature shock that the drying agent experiences in the transition from one zone to the next zone is less drastic, and peak variations in the dew point of the dried air can be also be prevented upon changes of temperature, pressure, relative humidity and flow rate of the supplied gas to be dried.

Preferably means are provided to heat up the tapped-off intermediate flow for at least one intermediate zone, preferably by means of a heating element in the tap-off pipe concerned to the inlet of the intermediate zone concerned.

Heating up the intermediate gas flow can result in the cooled and dried gas at the outlet of the drying zone being able to absorb more moisture when it comes into contact with the drying agent in the intermediate zone.

When such an intermediate zone with a heated intermediate gas flow is between the start of the drying zone and the end of the regeneration zone, the drying agent that has already gone through a complete regeneration cycle comes into contact with this heated dry intermediate gas that can still absorb an additional fraction of moisture from the drying agent. It is then called a 'deep drying treatment' of the drying agent. The operational reliability and high dryer efficiency can thus be ensured.

A dryer according to the invention can be constructed with one or more of the following intermediate zones:
  an intermediate cooling zone at the end of the regeneration zone with an intermediate gas flow that is tapped off from the outlet of the drying zone and is guided by means of an aforementioned blower, without heating, to the inlet of the intermediate cooling zone concerned;
  an intermediate regeneration zone at the end of the regeneration zone with an intermediate gas flow that is tapped off from the outlet of the drying zone and is guided by means of an aforementioned blower, after having been heated, to the inlet of the intermediate regeneration zone concerned;
  an intermediate cooling zone at the start of the regeneration zone with an intermediate gas flow that is tapped off from the outlet of the drying zone and is guided by means of an aforementioned blower, without heating, to the inlet of the intermediate cooling zone concerned;
  an intermediate regeneration zone at the start of the regeneration zone with an intermediate gas flow that is tapped off from the outlet of the drying zone and is guided by means of an aforementioned blower, after having been heated, to the inlet of the intermediate regeneration zone concerned.

Preferably only one single shared blower is used for a number of or all intermediate zones, which benefits the cost and size of the dryer.

For example in the case that there are different intermediate zones that are separated from one another, means can be provided for the distribution of the gas flow from a blower over these intermediate zones, for example in the form of one or more constrictions, that are adjustable and controllable or otherwise, in the tap-off pipes to the intermediate zones.

According to a specific embodiment, the aforementioned blower is provided with controllable drive means that are connected to a control system to which one or more sensors are connected, for example to determine the pressure difference between the outlet of the drying zone on the one hand, and the inlet of the regeneration zone on the other hand, and whereby the aforementioned control system can be provided with an algorithm that controls the speed of the aforementioned drive means on the basis of the aforementioned pressure difference.

In this way an active continuous control can be applied that prevents moist gas getting into the outlet of the drying zone under all circumstances. A further increase of the reliability of the dryer can thus be obtained.

According to a special characteristic of the invention the dryer is further provided with restriction means that prevent gas from being able to flow from the drying zone to the regeneration zone via the connecting pipe. According to one embodiment, such restriction means can comprise a non-return valve that is affixed in the aforementioned connecting pipe, and which is configured such that it only allows a gas flow from the regeneration zone to the drying zone, and not vice versa.

In this way it can be ensured that, even when the dryer is not operating because no gas to be dried is supplied, the drying zone can be kept under pressure at least for a certain time, and also when starting the dryer again the aforementioned pressure difference is present or at least can be reached more quickly.

The aforementioned heating element can also be made to be controllable. This means that the temperature of this heating element can be made adjustable by providing control means that can be adjusted either manually, or by means of a control unit, or in both ways. If desired, the heating element can be provided with a temperature sensor for measuring the temperature in the heating element, whereby this temperature sensor can be connected to a control unit for example, in order to aim for a set value of the temperature by means of a PID controller for example, by comparing the measured temperature value to such a set value and then adjusting the temperature in the heating element in accordingly, either manually or automatically by means of such a control unit.

The present invention also relates to a compressor installation provided with a compressor with an inlet for gas to be compressed and a pressure pipe for compressed gas, whereby the compressor installation comprises a dryer as described above for drying the entire flow of compressed gas supplied by the compressor that is guided through the dryer for the supply of dried gas to a consumer network via a tap-off point at the outlet of the drying zone, whereby to this end the pressure pipe connects to the inlet of the regeneration zone of the dryer.

Such a compressor installation presents the advantages described above of high reliability, optimisation of deep drying of the drying agent and energy-saving measures through the application of the full flow principle.

The dryer that forms part of a compressor installation according to the invention can be constructed in many ways and may or may not present the preferred characteristics that are described above with the resulting accompanying benefits.

In a specific embodiment of a compressor installation according to the invention no tap-off pipe is connected to the aforementioned pressure pipe.

According to a specific aspect of the invention the aforementioned blower is provided with a controllable drive, for example in the form of a frequency controlled motor.

According to a specific aspect of the invention, the compressor for the supply of gas to be dried can also be provided with a controllable drive, for example in the form of a frequency controlled motor.

In the case that both the compressor and the blower are provided with such a controllable drive it is preferable to provide a shared control system for both.

The aforementioned control system can be provided with an algorithm that stops the blower when the compressor stops.

If applicable restriction means can also be provided that prevent gas from being able to flow from the drying zone to the regeneration zone via the connecting pipe.

According to a specific embodiment, such restriction means can comprise a controllable shut-off valve that is connected or otherwise to the aforementioned control system or otherwise for the control of this shut-off valve.

The present invention also relates to a method for drying compressed gas, whereby this method comprises the following steps:

driving the entire hot compressed gas flow originating from a compressor through a regeneration zone of a dryer that is provided with a vessel with a drying zone therein, in addition to the aforementioned regeneration zone, and a rotatable drum in the vessel with a regenerable drying agent therein;

rotating the aforementioned drum such that the drying agent is moved successively through the drying zone and the regeneration zone;

the cooling of the aforementioned gas flow, after passing through the aforementioned regeneration zone and the separation of the condensate from this gas flow;

subsequently guiding the concerned gas flow through the aforementioned drying zone for drying this gas flow for supply to a consumer network;

directing an intermediate gas flow of dried gas, that is tapped off at the outlet of the drying zone only by means of one or more blowers that are in a tap-off pipe that connects the aforementioned outlet of the drying zone to the inlet of the intermediate zone, through an intermediate zone between the drying zone and regeneration zone.

A preferred characteristic of a method according to the invention for drying gas consists of the tapped-off part of dried gas first being heated before being guided to the intermediate zone, so that this zone can be used for the deep drying of the drying agent.

A specific aspect of the invention consists of the gas flow that is tapped off from the outlet of the drying zone for the intermediate zone is subject to a pressure increase such that the pressure at the inlet of the intermediate zone is higher than the pressure at the inlet of the regeneration zone.

BRIEF DESCRIPTION OF THE DRAWINGS

With the intention of better showing the characteristics of the present invention, a few preferred embodiments of a dryer and a compressor installation according to the invention, and a few preferred ways for implementing a method according to the invention for drying compressed gas are described hereinafter by way of an example, without any limiting nature, with reference to the accompanying drawings, wherein.

DETAILED DESCRIPTION OF THE INVENTION

Figure 1:
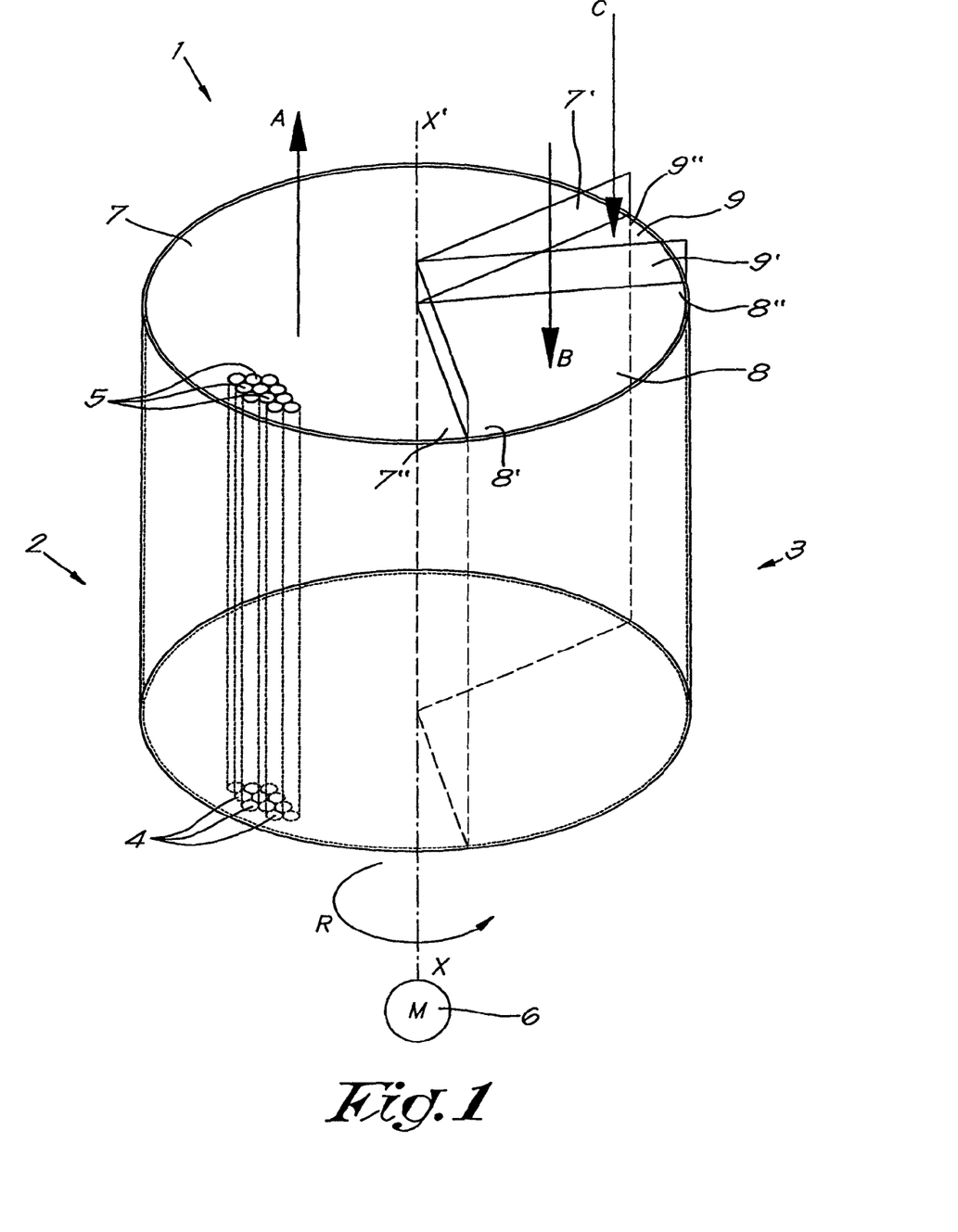
FIG. 1 schematically shows a perspective view of a section of a dryer according to the invention.

FIG. 1 shows a section 1 of a dryer according to the invention for compressed gas. The section 1 of the dryer is provided with a housing in the form of a vessel 2 with a drum 3 therein that is rotatable around its axis X-X' and through which, as is known, flow channels 4 extend essentially axially, as shown schematically in FIG. 1.

The drum 3 is filled with a drying agent 5, more specifically a desiccant, for example in the form of silica gel, active alumina, activated carbon or another material that enables moisture to be absorbed from a gas flow.

The dryer is also provided with drive means 6, for example in the form of a motor, for rotating the drum 3 in a direction of rotation indicated by arrow R.

The aforementioned drive means 6 may or may not be entirely or partially surrounded by the vessel 2 or a part thereof. In this way these drive means 6 can extend through a bottom flange of the aforementioned vessel 2 for example. The drive means 6 may enable the speed of rotation of the drum 3 to be adjusted or varied or otherwise.

The vessel 2 is divided into sectors to form a drying zone 7, a regeneration zone 8 and an intermediate zone 9 that is situated between the drying zone 7 and the regeneration zone 8.

In the example of FIG. 1 the drying agent 5 moves with the driving of the drum 3 in the direction of the arrow R in a cyclic way successively through the drying zone 7, the regeneration zone 8 and the intermediate zone 9.

The drying agent 5 thereby goes from the end 7" of the drying zone 7 to the start 8' of the regeneration zone, and then from the end 8" of the regeneration zone 8 to the start 9' of the intermediate zone 9, and from the end 9" of the intermediate zone 9 to the start 7' of the drying zone 7, and again further to the regeneration zone 8 after having gone through the drying zone 7.

Figure 2:
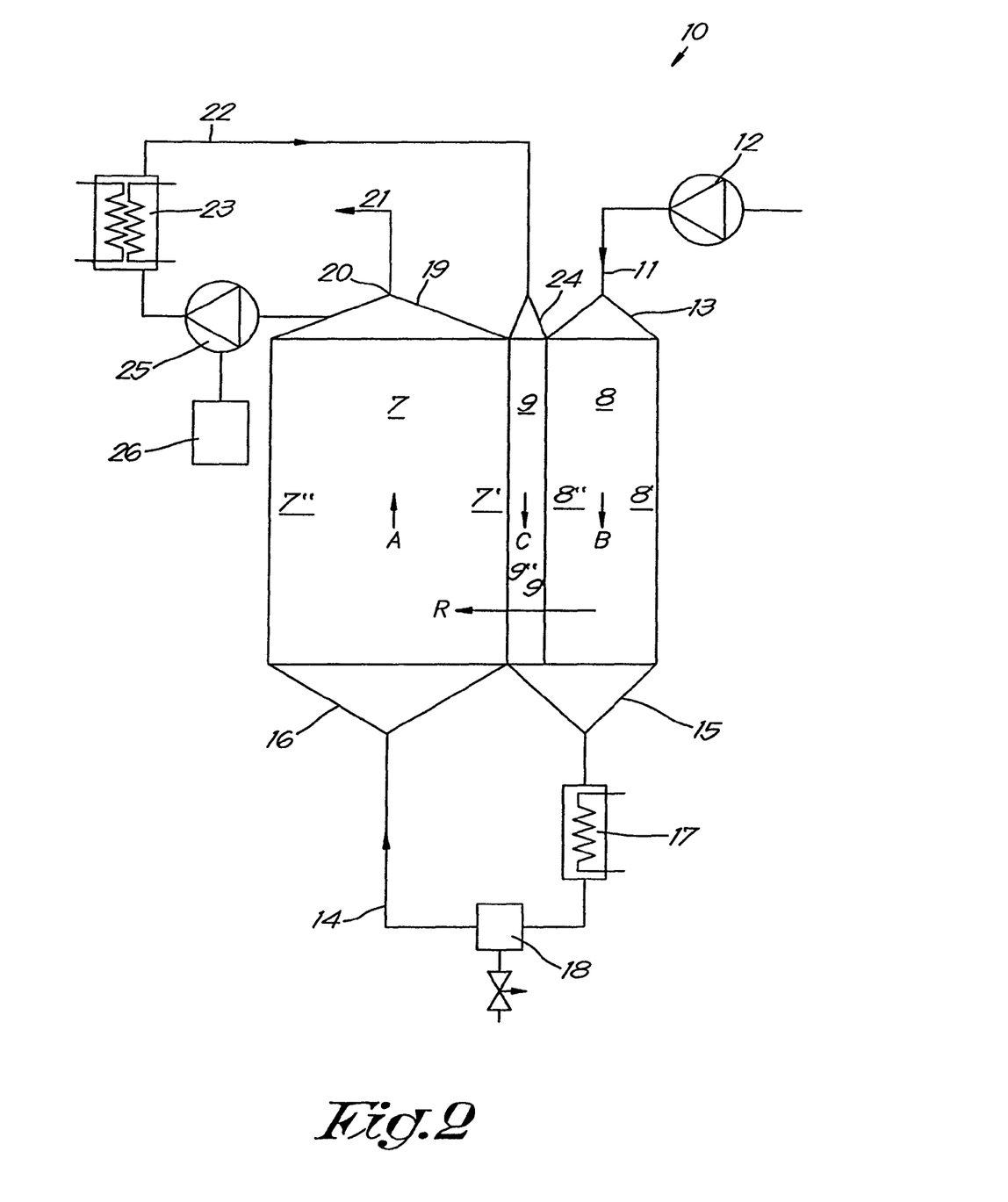
FIG. 2 schematically shows a compressor installation according to the invention.

FIG. 2 schematically shows a compressor installation 10 according to the invention, which in addition to the aforementioned section 1, comprises a pressure pipe 11 that forms a connection between the outlet of a compressor 12 and an inlet 13 of the regeneration zone 8, whereby this inlet 13 is also the inlet of the dryer. The compressor 12 also forms part of the compressor installation 10.

It is clear that the aforementioned compressor 12 can be of different types, for example a screw compressor, tooth compressor or scroll compressor that can be constructed as a multistage machine or otherwise, and in the case of a multistage machine it is provided or otherwise with an intercooler between the respective pressure stages.

According to a preferred aspect of the invention no tap-off is connected to the aforementioned pressure pipe 11 so that during operation the entire flow of hot compressed gas originating from the compressor 12 is guided to the regeneration zone 8 via an inlet 13.

Furthermore, a connecting pipe 14 is provided for the gas flow used for regeneration, whereby this connecting pipe 14 connects the common outlet 15 of the regeneration zone 8 and the intermediate zone 9 to the inlet 16 of the drying zone 7. There is a cooler 17 in this connecting pipe 14 and a condensate separator 18, whereby the said condensate separator 18 can be integrated into the cooler 15 or otherwise.

At the outlet 19 of the drying zone 7, on the one hand a take-off point 20 is provided that forms the outlet of the dryer and through which the dried gas can be removed to a consumer network 21 for further use, and on the other hand a tap-off pipe 22 is provided that drives a part of the dried gas through an optional heating element 23 that can be affixed in the tap-off pipe 22 concerned and then guides this part of tapped-off gas through the intermediate zone 9 as an intermediate gas flow. The presence of the heating element 23 is preferable for the invention, but not necessary.

According to a specific aspect of the invention the dryer comprises means for effectuating the second regeneration flow from the outlet 19 of the drying zone 7 to the inlet 24 of the intermediate zone 9, whereby these means comprise a blower 25 with a drive 26.

The operation of the compressor installation 10 according to FIG. 2 is very simple and as follows.

The directions of the flows are indicated in the drawings. Arrow A shows the flow direction of the flow through the drying zone 7 of the dryer. The flow direction of the other gas flows through the regeneration zone 8 and intermediate zone 9 is, in the example shown, in the opposite direction to the flow direction A of the flow through the drying zone 7, as shown by the arrows B and C.

The hot compressed gas to be dried originating from the compressor 12 in this case first flows in the form of a "full flow" through the drying agent 5 in the regeneration zone 8 to the outlet 15. Hereby this gas acts as a regeneration flow that absorbs moisture from the drying agent 5, making use of the heat of compression present in this first regeneration flow.

The heat in the compressed gas to be dried originating from the compressor 12 is generated during the compression of the gas to be dried by means of the compressor 12. This is consequently the 'heat of compression'.

According to a specific characteristic of the invention, at the end of the movement of the drying agent 5 through the regeneration zone 8, this drying agent 5 is further dried in the intermediate zone 9, by bringing the drying agent 5 into contact with dried gas that is tapped off from the outlet 19 of the drying zone 7 via the tap-off pipe 22, after first having been heated by means of the heating element 23 in the tap-off pipe 22 in order to reduce the relative humidity of this tapped-off dried gas.

It is clear that in this way the moisture content of the drying agent 5 can be substantially reduced due to the drying agent 5 being further dried in the intermediate zone 7 by making use of a hot dry gas with very low relative humidity.

In this case the intermediate zone thus fulfils the role of additional regeneration zone in which the drying agent 5 is dried further, also called deep drying of the drying agent 5.

As the drum 3 rotates further, more and more moisture is extracted from the drying agent 5 until the drying agent 5 reaches the drying zone 7, stripped of the adsorbed moisture, so that the thus regenerated drying agent 5 can be used for drying in the drying zone 7.

The gas that goes into the connecting pipe 14 via the outlet of the regeneration zone 8 is cooled by means of the cooler 17. The condensate hereby formed is removed by means of a condensate separator 18. The 100% saturated gas is then transported through the drying zone 7 where it is dried by means of the drying agent 5. The thus dried gas can be tapped off via the take-off point 20 to the consumer network 21 located downstream.

In the way described above the drying agent 5 is guided alternately through the drying zone 7 and then through the first regeneration zone 8 and the second regeneration zone 9 in a continuous or discontinuous rotating movement.

Thanks to the blower 25 in the tap-off pipe 22 not only is the operational reliability and dryer efficiency increased, but this blower 25 also ensures that the pressure at the inlet 24 of the intermediate zone 9 can be kept higher than at the inlet 13 of the regeneration zone 8, such that the intermediate zone 9 as it were forms a barrier for the occurrence of any undesired leaks of moist gas from the inlet 13 of the regeneration zone 8 to the dried gas at the outlet 19 of the drying zone 7, and thus the occurrence of pollution of the dried gas flow is limited.

The blower can have a limited capacity as the gas flow tapped off at the outlet 19 of the drying zone is only a fraction of the total gas flow from the compressor 12 that is guided through the dryer.

It is clear that the shared outlet 15 is split into two outlets that are connected together and to the cooler 17.

Figure 3:
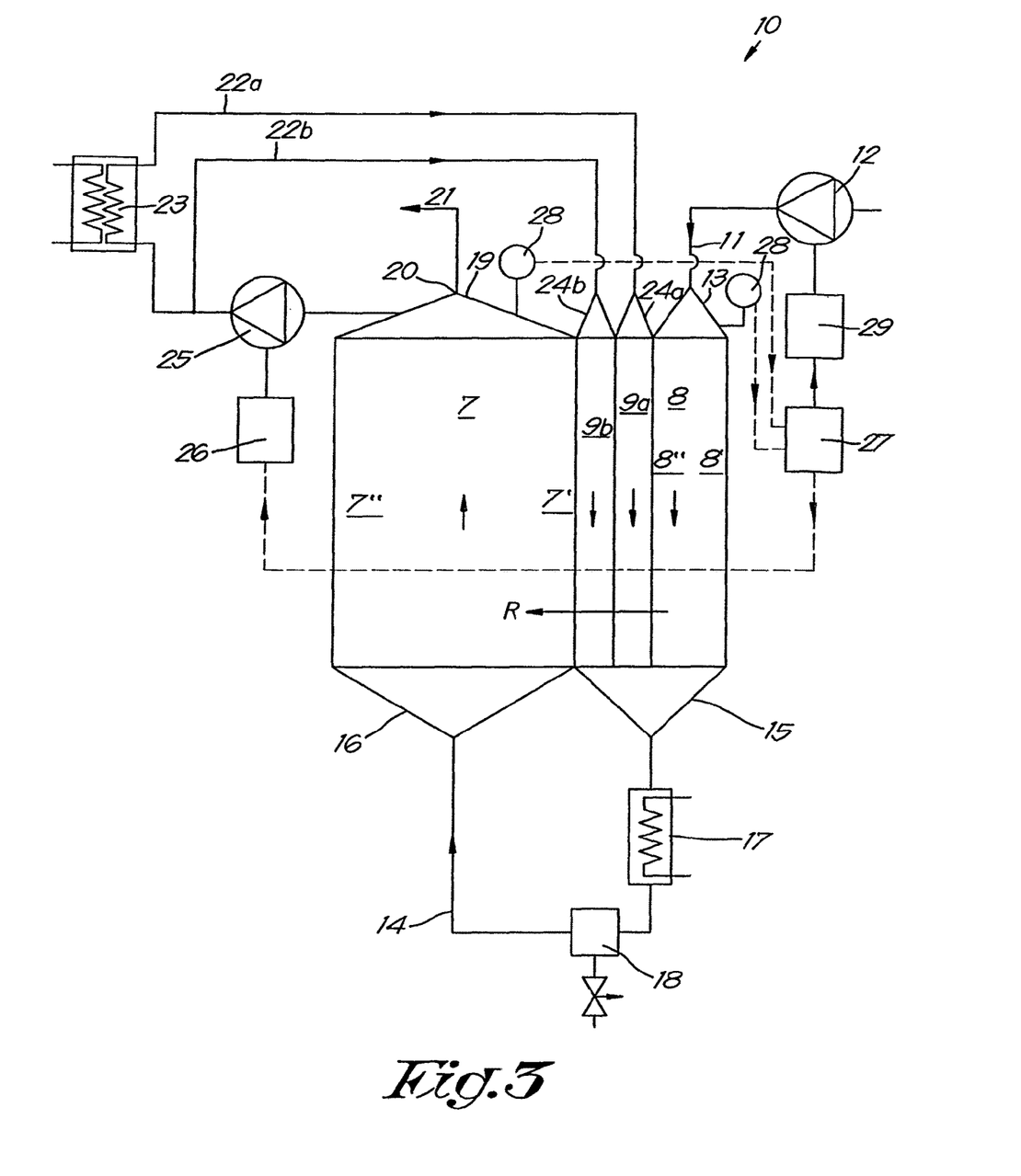
FIGS. 3 to 10 show variants of a compressor installation according to FIG. 2.

FIG. 3 shows a variant embodiment of a compressor installation 10 according to the invention that differs from the embodiment of FIG. 2 in the fact that, in addition to the intermediate zone 9a of FIG. 2 through which the tapped-off dried and heated gas is guided, a second intermediate zone 9b is provided between the first intermediate zones 9a and the drying zone 7, whereby this second intermediate zone 9b has a separate inlet 24b, and together with the intermediate zone 9a and the regeneration zone 8 leads to the shared outlet 15.

The gas that is guided through this second intermediate zone is, in the example shown, tapped off after the blower 25 and fed back to the inlet 24b via the tap-off pipe 22b.

In this case it concerns dried gas, which, in view of the cooling in the cooler 17, is also a cool gas.

In this way the hot drying agent 5 is cooled before coming into contact with the main flow in the drying zone 7 when leaving the first intermediate zone 9a. The first intermediate zone 9a then acts as a regeneration zone as explained, while the second intermediate zone 9b acts as a cooling zone.

Such a cooling zone leads to an optimisation of the drying because hot drying agent 5 is not able to adsorb moisture, which means that moist gas could leak through the dryer. This is thus prevented by using a second intermediate zone 9b arranged as a cooling zone.

In the embodiment of FIG. 3 the drive 26 of the blower 25 is made controllable, for example in the form of a frequency controlled motor, whereby this drive 26 is connected to a control system 27 ('controller') to which one or more sensors 28 are connected for determining the pressure difference between the outlet 19 of the drying zone 7 on the one hand, and the inlet 13 of the regeneration zone 8 on the other hand, and whereby the aforementioned control system 27 is provided with an algorithm that changes the speed of the aforementioned drive 26 on the basis of the aforementioned pressure difference.

In this example the compressor 12 is also provided with a controllable drive 29 which in this case, but not necessarily, is also connected to the aforementioned control system 27 for the control thereof.

This offers the possibility for example to stop the blower 25 when the compressor 12 stops.

With such an embodiment as shown in FIG. 3 the flow rate through the intermediate zones 9a and 9b can be controlled such that these flows can always be maintained with a slight overpressure with respect to the pressure at the outlet 19 of the drying zone 7.

Instead of providing one single shared blower 25 for both intermediate zones 9a and 9b, it is also possible to provide a separate blower in each tap-off pipe, which makes it possible to control the flow rate to these zones separately.

For the adjustment or control of the flow rates, alternatively it is possible to provide restrictions or other flow controllers in the tap-off pipes 22a and 22b, that are adjustable or controllable or otherwise by means of the control system 27.

Figure 4:
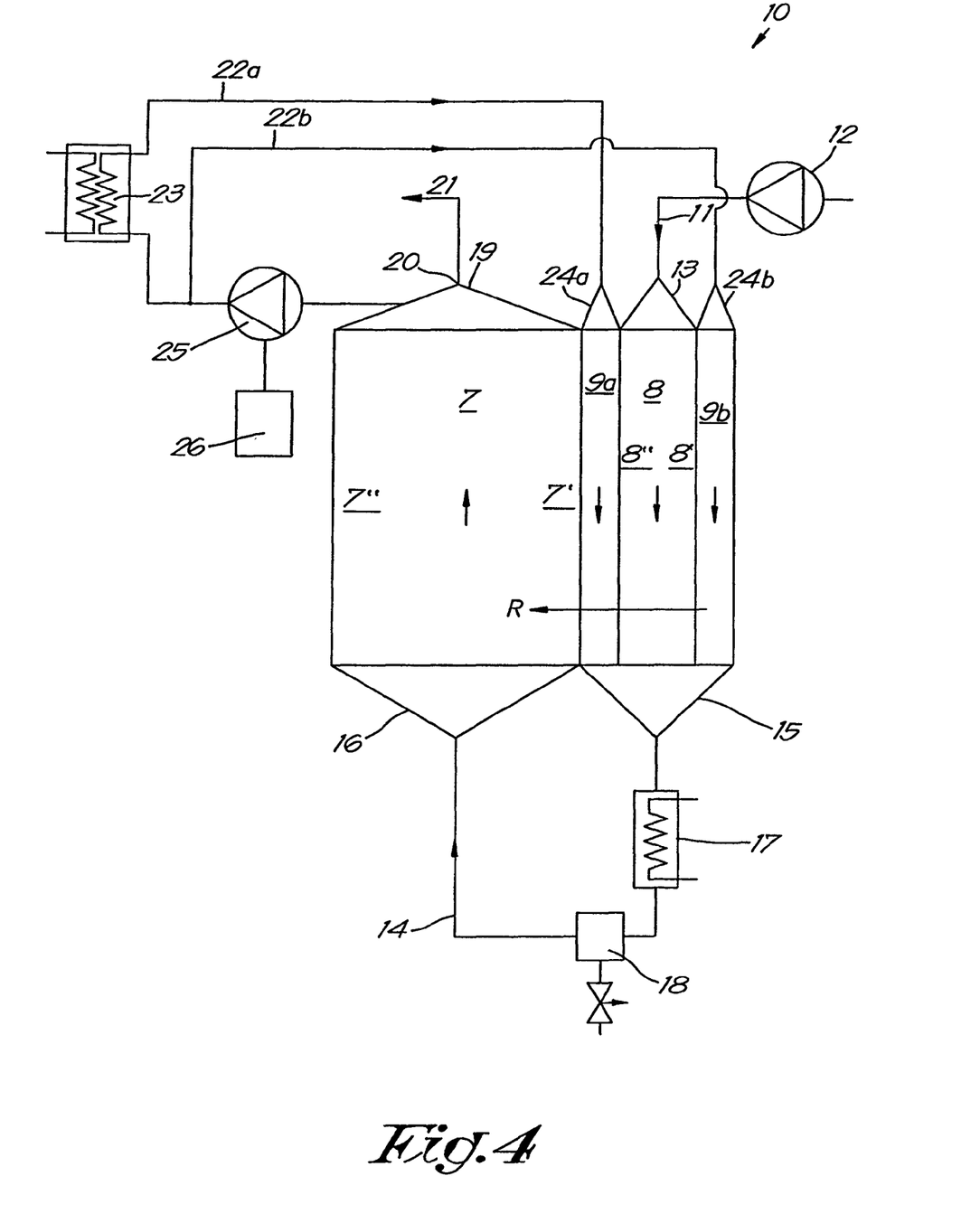

FIG. 4 shows another embodiment of a compressor installation 10 according to the invention, whereby in this case, with respect to the embodiment of FIG. 3, the second intermediate zone 9b that acts as a cooling zone is moved to the start 8' of the regeneration zone 8 instead of at the end 8" of this zone 8, so that in this case both the drying zone 7 and the regeneration zone 8 are separated from one another by the intermediate zones 9a and 9b with an increased pressure with respect to the pressure at the outlet 19 of the drying zone.

This thus prevents moist gas from being able to leak away from the inlet 13 of the regeneration zone 8 to the dried gas in the outlet 19 of the drying zone 7 and this both at the start 7' and at the end 7" of the drying zone 7.

Figure 5:
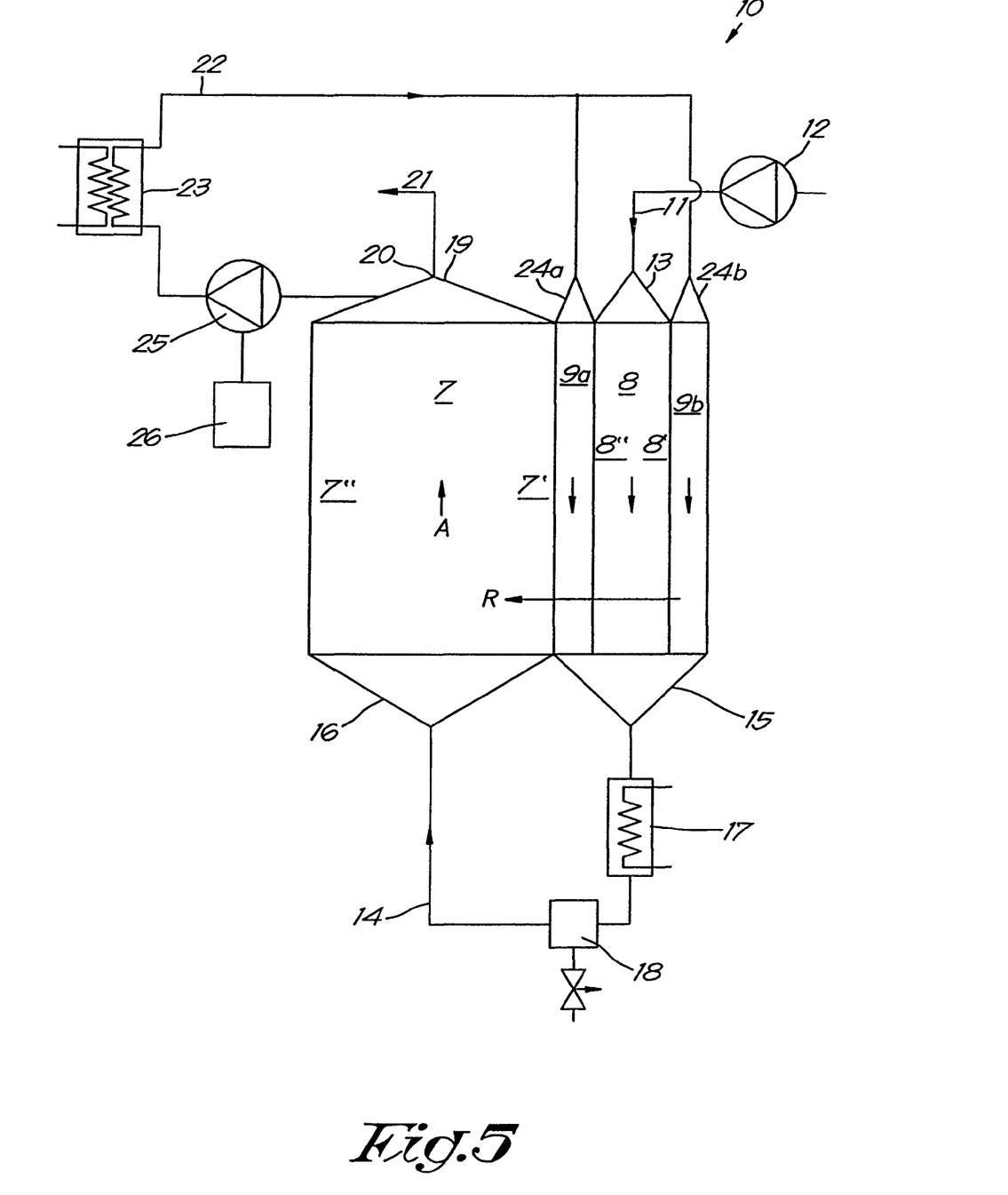

FIG. 5 shows another variant of a compressor device 10 according to the invention, which differs from the compressor installation 10 of FIG. 4 by in this case both intermediate zones 9 being provided with dry gas that has been tapped from the outlet 19 of the drying zone 7 and which, after a pressure increase in the blower 25, is heated in the heating element 23, and in so doing both play a role as an intermediate zone 9a with a regenerating function.

Figure 6:
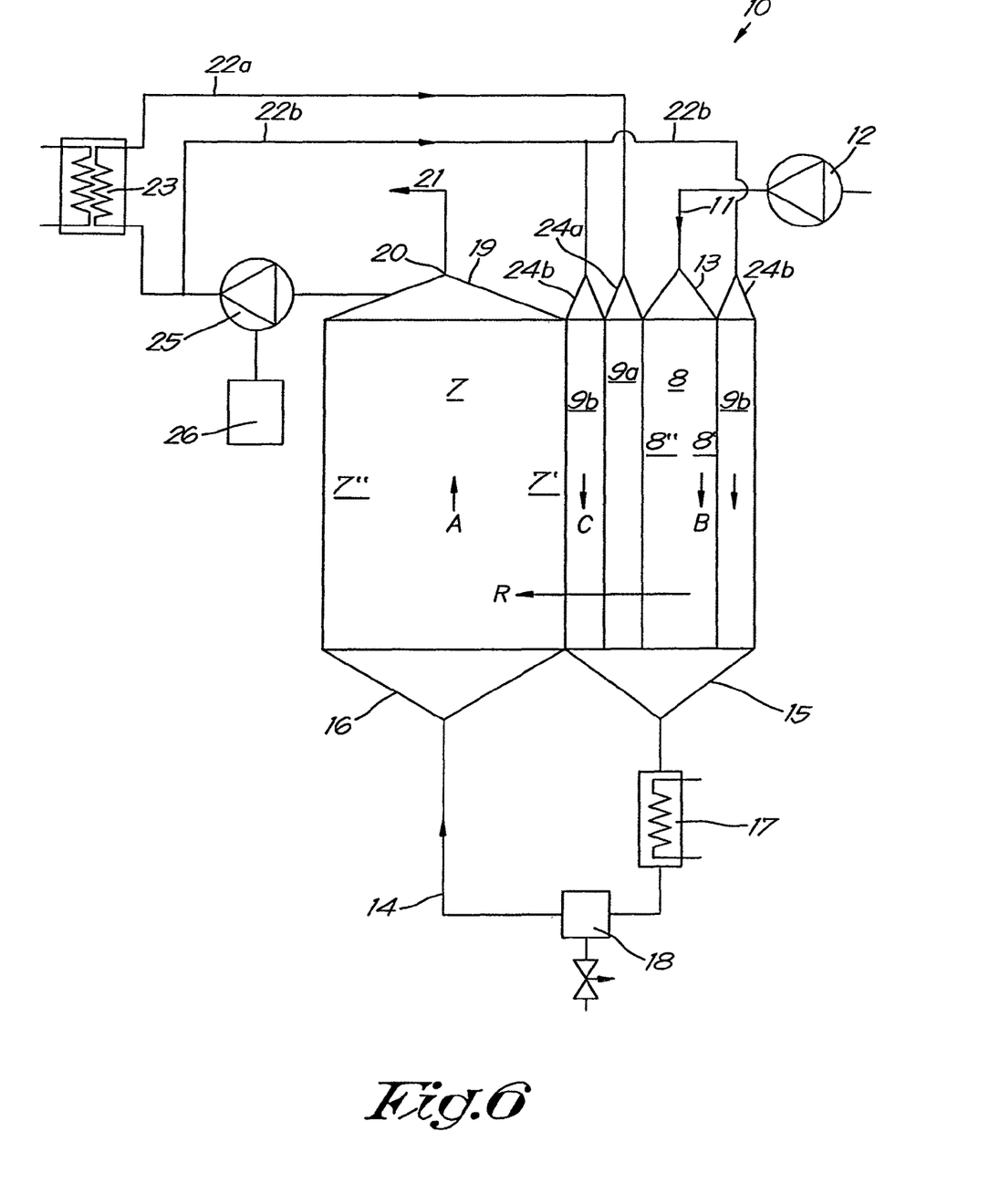

FIG. 6 shows another variant whereby in this case, with respect to the embodiment of FIG. 3, a third intermediate zone 9 is inserted between the end 7" of the drying zone 7 and the start 8' of the regeneration zone 8, whereby this third intermediate zone acts as an additional cooling zone 9b that is provided with a dried and cooled gas that is tapped off from the tap-off pipe 22a downstream from the blower 25 and upstream from the heating element 23, whereby the two intermediate zones 9b are supplied in parallel by the tap-off pipe 22b.

Figure 7:
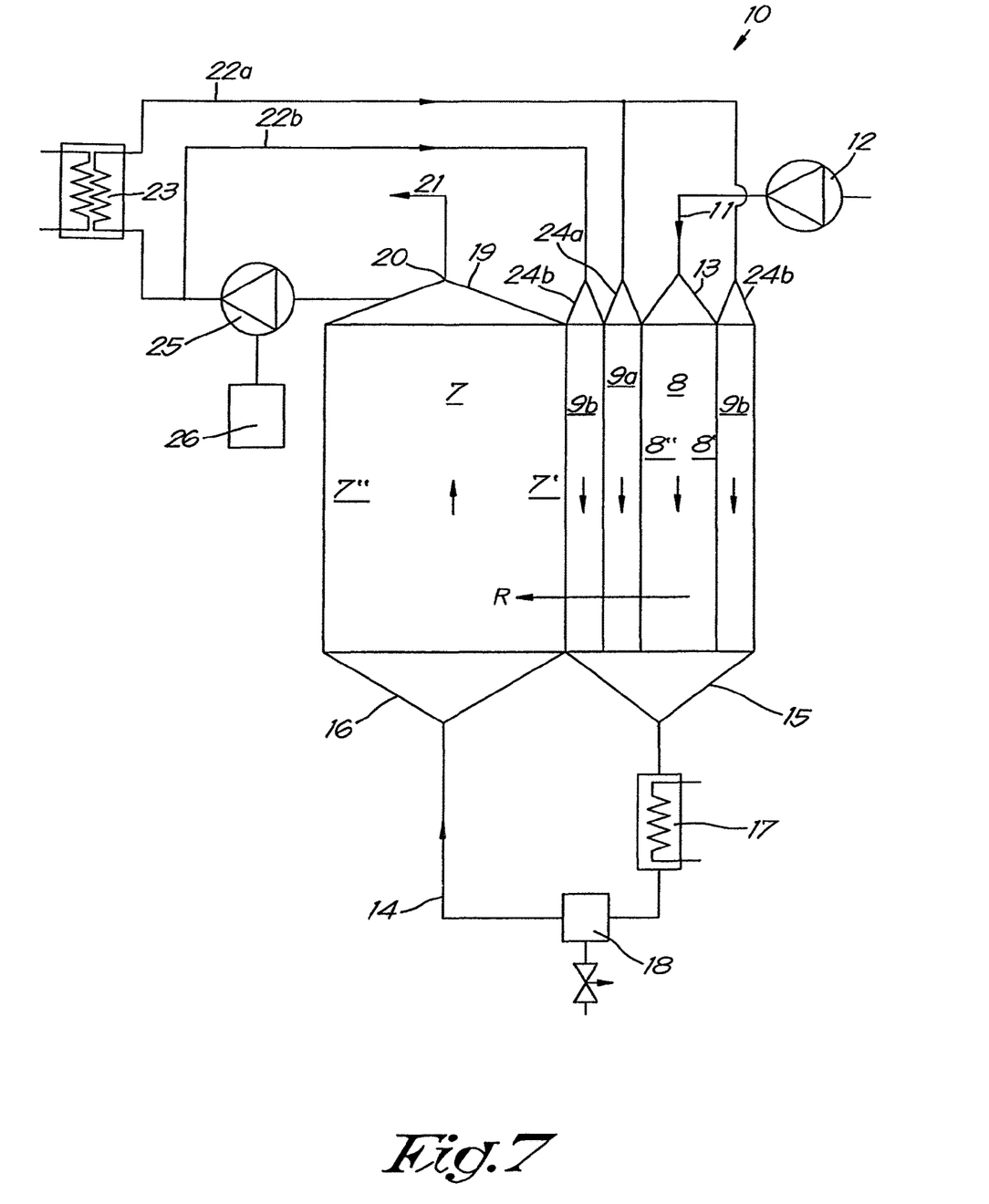

Another possible variant is shown in FIG. 7, whereby in this case the third intermediate zone 9 between the end 7" of the drying zone 7 and the start 8' of the regeneration zone 8 is provided with dry heated air tapped off from the outlet 19 of the drying zone 7 and increased in pressure by the blower 25, so that this zone 9 also acts as a regeneration zone 9a.

According to a variant not shown, it is not excluded to insert a fourth intermediate zone 9, so that the drying zone 7 and regeneration zone 8 are separated from one another at both the start and at the end of these zones, each time by two intermediate zones 9a and 9b, respectively an intermediate zone 9a with a regenerating function and an intermediate zone 9b with a cooling function, whereby the intermediate zones 9a with a regenerating function preferably border the regeneration zone 9 and the intermediate zones 9b border the drying zone 7.

Figure 8:
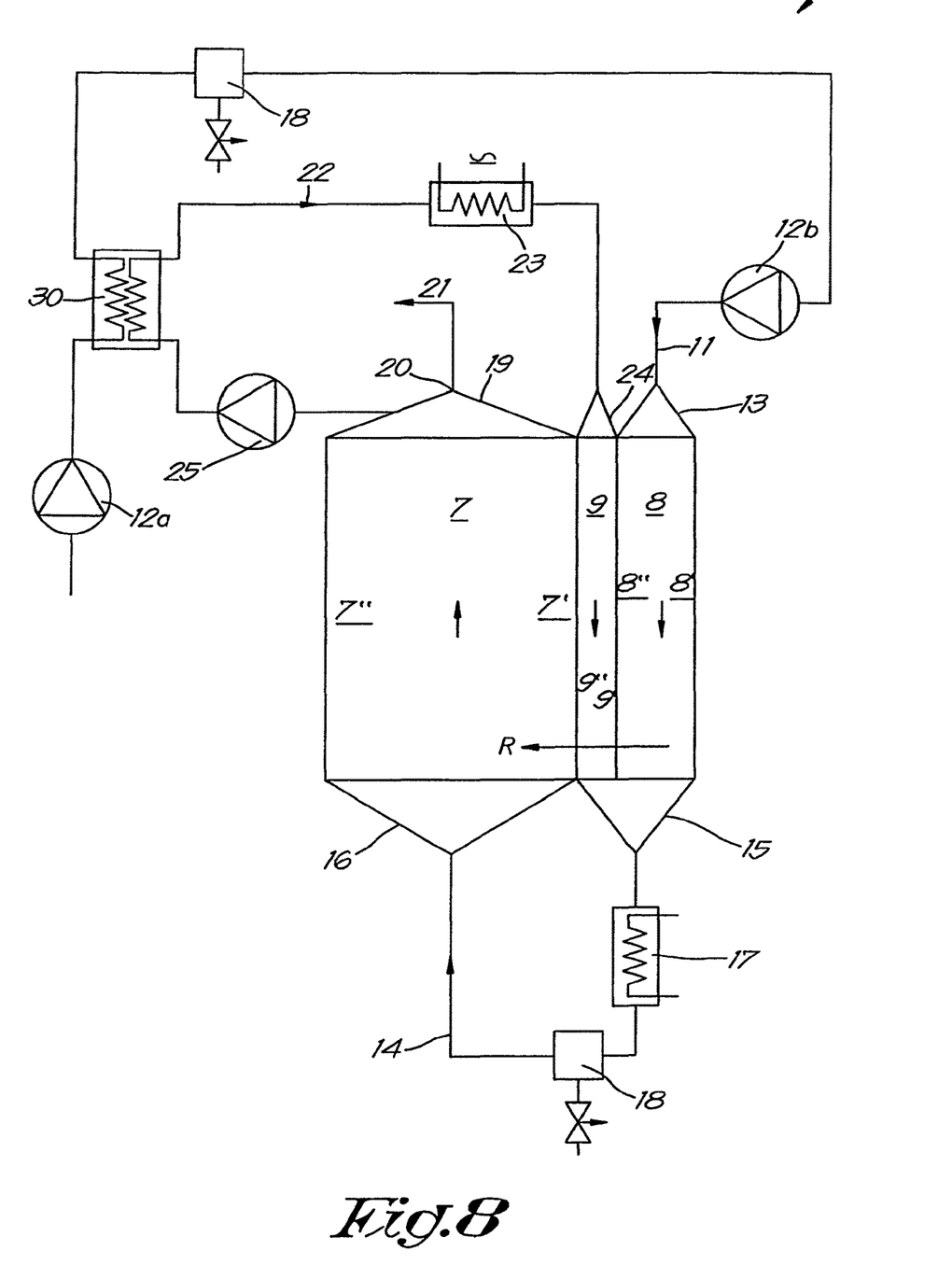
Figure 9:
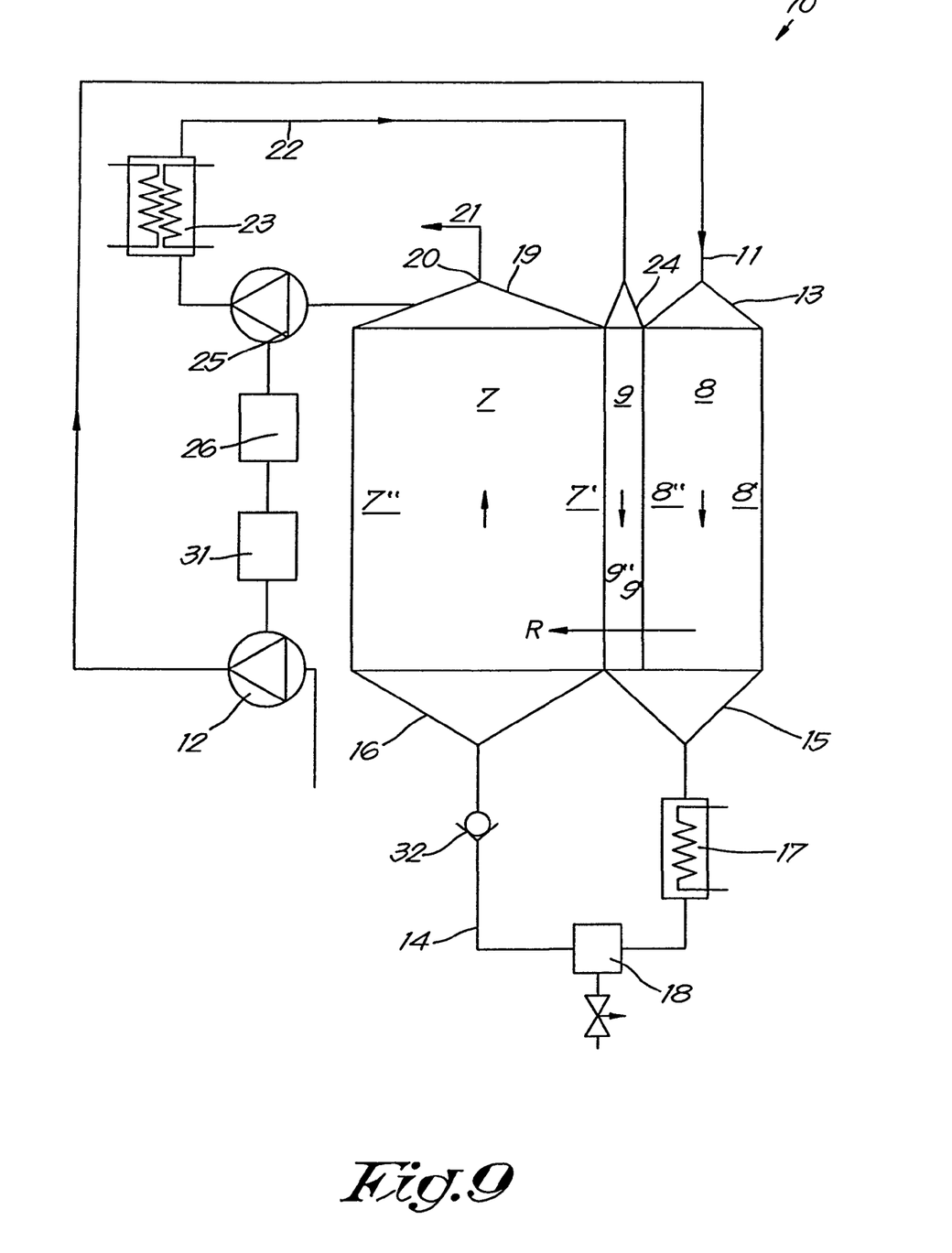
Figure 10:
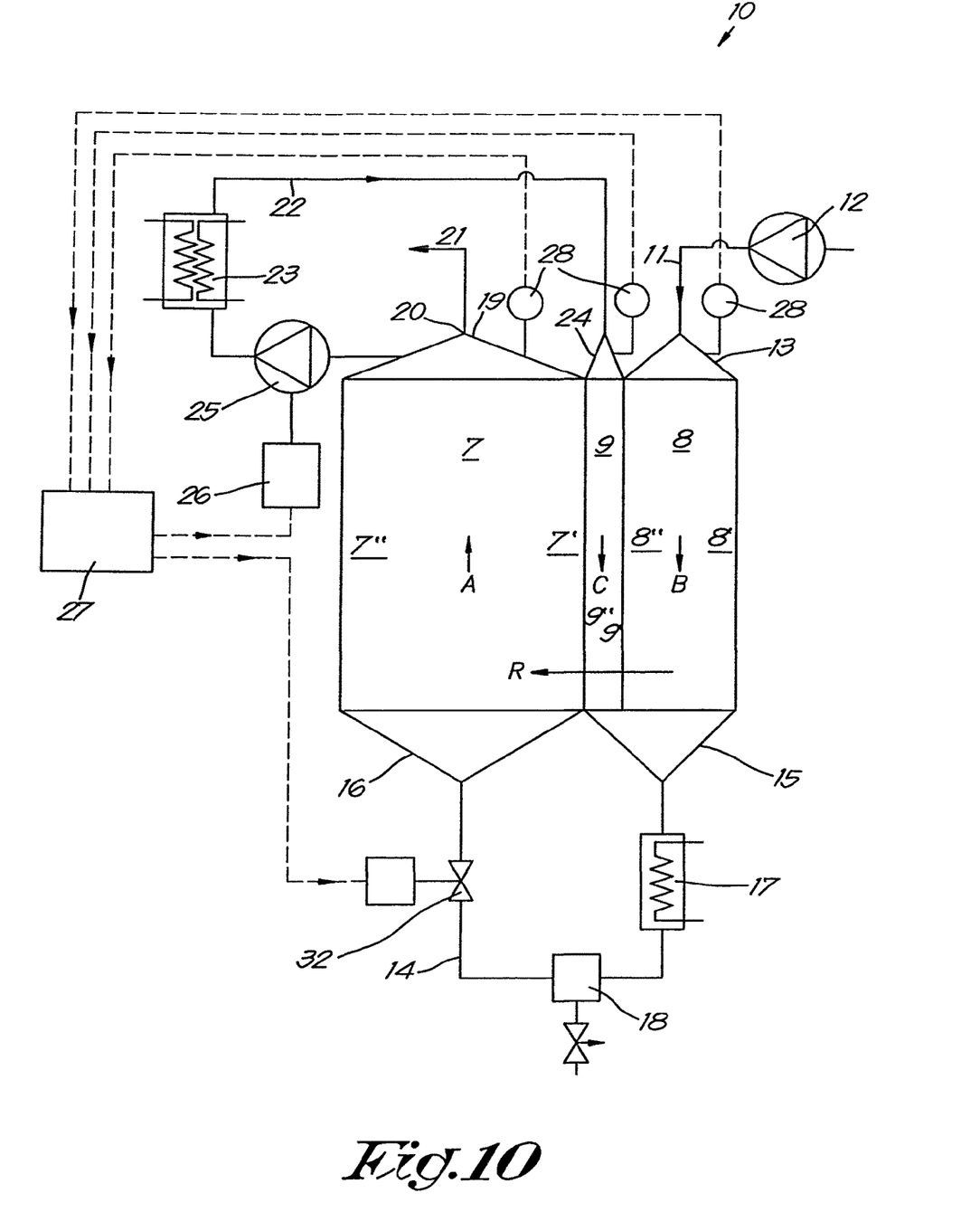

In FIGS. 8 to 10 a few additional characteristics are dealt that are described as an extension to the compressor installation of FIG. 2, but apply just as well to the compressor installations of FIGS. 3 to 7.

FIG. 8 shows another embodiment whereby in this case for heating the tapped-off gas in the tap-off pipe 22 an intercooler 30 is used that is provided between two pressure stages 12a and 12b of the compressor, immediately following one another or otherwise. If applicable, this intercooler 30 can be supplemented with additional heating in the tap-off pipe 22, for example in the form of a separate electric heating element 23 as shown by a dashed line.

In this example a condensate separator 18 is provided between the intercooler 30 and the second pressure stage 12b of the compressor.

The operation of such an embodiment is practically analogous to that of FIG. 2. Here too the blower 19 will ensure that the regeneration flow remains guaranteed, while moreover undesired leaks from the inlet 13 from the regeneration zone 7 to the outlet 19 of the drying zone 3 are prevented.

The most important additional advantage of this embodiment is that less energy has to be supplied to the heating element 23 because heat of compression is recovered from after the first pressure stage 12a.

If need be, a small additional cooler can be provided between the pressure stages 12a and 12b in order to always realise sufficient intercooling of the compressed gas.

In the example shown in FIG. 9, the compressor 12 and the blower 25 are provided with a single drive 26, for example in the form of one electric motor that drives the compressor 12 and blower 25 concerned, via a transmission 31 or otherwise.

In this example, restriction means 32 are provided in the connecting pipe 14 that prevent gas from being able to flow from the drying zone to the regeneration zone 9 via the connecting pipe 14. In one preferred embodiment, the aforementioned restriction means 32 comprise a non-return valve that is affixed in this connecting pipe 14.

The operation of this embodiment is the same as that of the embodiments previously described. The interesting thing regarding this embodiment is that only one drive has to be provided, such that costs can be saved in the production, purchase and maintenance, and that the control can be simplified.

In a method according to the invention the gas that is driven through the intermediate zone 9 does not necessarily originate from the dryer itself, but it can also originate from an external source of dried gas. An external source can comprise air or other gases or mixtures that are subject to a variety of dew point suppressing measures, such as 'pressure swing', 'vacuum swing' and/or cool drying principles.

FIG. 10 shows another embodiment of a compressor installation 10 according to the invention, whereby in this case the aforementioned restriction means 32 are constructed in the form of a controllable shut-off valve that is connected to the control system 27. In this example not only are the outlet of the drying zone 7 and the inlet of the regeneration zone 8 provided with a sensor 28, but such a sensor 28 is also provided at the inlet of the intermediate zone 7, for example in the form of a pressure sensor that is also connected to the aforementioned control system 27.

By making use of three sensors 28 an optimum pressure balance between the different zones in the dryer is maintained by responding to this, for example by controlling the speed of the blower 25. In this way undesired leakage losses between the zones 7, 8 and 9 together can be prevented or it can be ensured that leaks only occur in a direction that affects the efficiency of the dryer to a minimum.

According to a specific aspect no blower or other pressure-increasing means are provided in the tap-off pipe 14.

According to another specific aspect of the present invention the dryer does not comprise a venturi ejector.

The present invention is by no means limited to the embodiments described as an example and shown in the drawings, but a dryer and compressor installation according to the invention, and a method according to the invention for drying compressed gas can be realised in many forms and dimensions and in different ways without departing from the scope of the invention.

The invention claimed is:

1. A dryer for a compressed gas supplied, comprising:
a vessel with a drying zone and a regeneration zone therein;
an inlet for the regeneration zone that is also an inlet for a supply of gas to be dried and an outlet for the regeneration zone;
an inlet for the drying zone and an outlet for the drying zone that is also the outlet of the dryer from where dried compressed gas is able to be tapped off for a downstream consumer network;
a rotatable drum in the vessel with a regenerable drying agent therein;
drive means for rotating the rotatable drum such that the drying agent is moved successively through the drying zone and the regeneration zone;
a connecting pipe that connects the aforementioned outlet of the regeneration zone to the aforementioned inlet of the drying zone;
a cooler and a condensate separator incorporated in the connecting pipe;
at least one intermediate zone that, viewed in a direction of rotation of the drum, is situated between the regeneration zone and the drying zone and which is provided with a separate inlet and an outlet that is shared with or connected to the outlet of the regeneration zone;
a tap-off pipe that branches off from the outlet of the drying zone and connects to the aforementioned separate inlet of the intermediate zone;
means for effectuating an intermediate flow from the drying zone, through the tap-off pipe, to the intermediate zone,
wherein the dryer is configured such that the entire flow of gas to be dried supplied to the dryer is first guided through the regeneration zone before flowing through the drying zone,
wherein the aforementioned means are only formed by one or more blowers in the aforementioned tap-off pipe,
wherein the dryer is provided with a control system and one or more sensors,
wherein the aforementioned one or more blowers is provided with a controllable drive, said controllable drive being connected to said control system to which said one or more sensors are connected to determine pressure difference between the outlet of the drying zone and the inlet of the regeneration zone, and
wherein the aforementioned control system is provided with an algorithm that changes a speed of the drive means on the basis of the pressure difference and wherein said at least one intermediate zone includes one or more of the following intermediate zones:
an intermediate cooling zone at the end of the regeneration zone with an intermediate gas flow that is tapped off from the outlet of the drying zone and is guided by means of the one or more blowers, without heating, to the inlet of the intermediate cooling zone concerned;
an intermediate regeneration zone at the end of the regeneration zone with an intermediate gas flow that is tapped off from the outlet of the drying zone and is guided by means of the one or more blowers, after having been heated, to the inlet of the intermediate regeneration zone concerned;

an intermediate cooling zone at the start of the regeneration zone with an intermediate gas flow that is tapped off from the outlet of the drying zone and is guided by means of the one or more blowers, without heating, to the inlet of the intermediate cooling zone concerned; or an intermediate regeneration zone at the start of the regeneration zone with an intermediate gas flow that is tapped off from the outlet of the drying zone and is guided by means of the one or more blowers, after having been heated, to the inlet of the intermediate regeneration zone concerned.

2. The dryer according to claim 1, wherein, viewed in the direction of rotation of the drum, the at least one intermediate zone is at the start of the drying zone, in other words at the side of the drying zone along which the drying agent leaves the regeneration zone during the rotation of the drum, in order to go into the drying zone.

3. The dryer according to claim 1, wherein, viewed in the direction of rotation of the drum, the at least one intermediate zone is at the end of the drying zone.

4. The dryer according to claim 1, wherein means are provided to enable the heating of the tapped-off intermediate flow to at least one intermediate zone, said means comprising a heating element in the tap-off pipe concerned to the inlet of the intermediate zone concerned.

5. The dryer according to claim 1, wherein when there is both an intermediate cooling zone and an intermediate regeneration zone at the start or at the end of the regeneration zone, and the intermediate cooling zone borders the drying zone.

6. The dryer according to claim 1, wherein there is only one blower for all intermediate zones.

7. The dryer according to claim 6, wherein there are means for the distribution of the gas flow from the blower over a number of intermediate zones.

8. The dryer according to claim 7, wherein the means for the distribution of the gas flow are formed by one or more constrictions, adjustable or controllable, in the tap-off pipes to the intermediate zones.

9. The dryer according to claim 1, wherein the dryer is provided with a restriction that prevents gas from being able to flow from the drying zone to the regeneration zone via the connecting pipe.

10. The dryer according to claim 4, wherein the aforementioned heating element is made to be adjustable.

11. The dryer according to claim 10, wherein the aforementioned heating element is provided with a temperature sensor for measuring the temperature in the heating element.

12. The dryer according to claim 11, wherein the aforementioned temperature sensor is connected to a control unit.

13. The dryer according to claim 12, wherein the control unit is formed by the control system.

14. The dryer according to claim 1, wherein this dryer does not comprise a venturi ejector.

15. A compressor installation provided with a compressor with an inlet for gas to be compressed and a pressure pipe for compressed gas, wherein the compressor installation comprises a dryer according to claim 1 for drying the entire flow of compressed gas supplied by the compressor that is guided through the dryer for the supply of dried gas to a consumer network via a tap-off point at the outlet of the drying zone, whereby to this end the pressure pipe connects to the inlet of the regeneration zone of the dryer.

16. The compressor installation according to claim 15, wherein the aforementioned compressor for the supply of gas to be dried is provided with a controllable drive and that the compressor installation for both controllable drives, respectively of the blower and of the compressor, comprises a shared control system.

17. The compressor installation according to claim 16, wherein the aforementioned control system of the drive of the blower is provided with an algorithm that stops the blower when the compressor stops.

18. The compressor installation according to claim 15, wherein a tap-off pipe is not connected to the aforementioned pressure pipe.

19. A method for drying compressed gas, comprising the steps of:

driving an entire hot compressed gas flow originating from a compressor through a regeneration zone of a dryer that is provided with a vessel with a drying zone therein, in addition to the aforementioned regeneration zone, and a rotatable drum in the vessel with a regenerable drying agent therein;

rotating the aforementioned drum such that the drying agent is moved successively through the drying zone and the regeneration zone;

cooling the aforementioned gas flow, after passing through the aforementioned regeneration zone and separating a condensate from this gas flow;

subsequently guiding the concerned gas flow through the aforementioned drying zone for drying this gas flow for supply to a consumer network;

directing an intermediate gas flow of dried gas, that is tapped off at an outlet of the drying zone only by means of one or more blowers that are provided in a tap-off pipe that connects the aforementioned outlet of the drying zone to an inlet of an at least one intermediate zone situated between the drying zone and the regeneration zone;

providing the dryer with a control system and one or more sensors, providing the aforementioned blower with a controllable drive, said controllable drive being connected to said control system to which said one or more sensors are connected to determine the pressure difference between the outlet of the drying zone, on the one hand, and the inlet of the regeneration zone, on the other hand, and wherein the aforementioned control system is provided with an algorithm that changes the speed of the aforementioned drive on the basis of the aforementioned pressure difference;

wherein the method comprises one or more of the following steps:

tapping off an intermediate gas flow from the outlet of the drying zone and guiding it by means of the one or more blowers, without heating it, to an inlet of an intermediate cooling zone provided at the end of the regeneration zone;

tapping off an intermediate gas flow from the outlet of the drying zone, heating it and guiding it by means of the one or more blowers to an inlet of an intermediate regeneration zone provided at the end of the regeneration zone;

tapping off an intermediate gas flow from the outlet of the drying zone and guiding it by means of the one or more blowers, without heating it, to an inlet of an intermediate cooling zone provided at the start of the regeneration zone;

tapping off an intermediate gas flow from the outlet of the drying zone, heating it and guiding it by means of the one or more blowers to an inlet of an intermediate regeneration zone provided at the start of the regeneration zone.

20. The method according to claim 19, wherein the gas flow that is tapped off from the outlet of the drying zone for the at least one intermediate zone is subject to a pressure increase such that the pressure at the outlet of the drying zone is higher than the pressure at the inlet of the regeneration zone.

* * * * *